United States Patent [19]

Head

[11] Patent Number: 4,636,807

[45] Date of Patent: Jan. 13, 1987

[54] APPARATUS AND METHOD FOR LIGHT VALUE GRAY SCALE RECORDING

[75] Inventor: Donald L. Head, Springboro, Ohio

[73] Assignee: The Mead Corporation, Dayton, Ohio

[21] Appl. No.: 839,402

[22] Filed: Mar. 14, 1986

[51] Int. Cl.$^4$ .................. G01D 15/14; G02F 1/03; H04N 1/21

[52] U.S. Cl. .................... 346/1.1; 250/578; 346/108; 346/160; 350/331 R; 350/356; 350/393; 358/213; 358/298; 358/302; 358/303; 358/75

[58] Field of Search .................. 346/1.1, 108, 160; 250/578; 350/331 R, 356, 393; 358/75, 213, 298, 302, 303

[56] References Cited

U.S. PATENT DOCUMENTS

| | | | |
|---|---|---|---|
| 3,447,862 | 6/1969 | Elpern | 350/269 |
| 3,604,846 | 9/1971 | Behane et al. | 358/263 |
| 3,876,288 | 4/1975 | Iwata et al. | 350/160 R |
| 3,922,484 | 11/1975 | Keller | 358/256 |
| 4,240,711 | 12/1980 | Baur et al. | 350/345 |
| 4,244,636 | 1/1981 | Baur et al. | 350/345 |
| 4,246,614 | 1/1981 | Knox | 358/283 |
| 4,316,196 | 2/1982 | Jacobs | 346/1.1 |
| 4,415,915 | 11/1983 | Sprague et al. | 346/160 |
| 4,449,153 | 5/1984 | Tschang | 358/296 |
| 4,505,551 | 3/1985 | Jacobs | 350/384 X |
| 4,524,372 | 6/1985 | De Cock et al. | 346/160 |
| 4,577,232 | 3/1986 | Hynecek | 358/213 |
| 4,581,619 | 4/1986 | Mizutome et al. | 346/160 |

*Primary Examiner*—E. A. Goldberg
*Assistant Examiner*—Gerald E. Preston
*Attorney, Agent, or Firm*—Biebel, French & Nauman

[57] ABSTRACT

Gray scale recording apparatus using an electro-optical light gate. The light gate comprises a series of side-by-side active electrode groups for controlling the recorded gray levels of corresponding side-by-side picture elements on a recording member. Each active electrode group comprises a plurality of switchable electrodes configured for at least partially encompassing a common interior point at successively greater distances.

10 Claims, 4 Drawing Figures

APPARATUS AND METHOD FOR LIGHT VALUE GRAY SCALE RECORDING

BACKGROUND OF THE INVENTION

The present invention relates to the production of images having image density variations, i.e., different gray levels. More particularly the invention relates to apparatus for producing representations of such gray levels in accordance with the halftone technique.

In traditional graphic arts work that technique has involved the photographing of a continuous tone original through a halftone screen. This produces a series of solid circular dots each having a diameter related to the average gray level of a corresponding picture element. In more recent times, halftone effects have been created by producing picture elements containing variably shaped dark areas created by any of a variety of different electronic processes. Typical examples are described in Behane et al. U.S. Pat. No. 3,604,846; Keller U.S. Pat. No. 3,922,484; and in Knox U.S. Pat. No. 4,246,614.

Another example of gray scale imaging is disclosed in Tschang U.S. Pat. No. 4,449,153 wherein a beam of light is directed through a light gate comprising an array of light valves. The ON time of each valve is selectively controlled in accordance with a desired gray level of a corresponding picture element. Light passing through the light valves is imaged onto an appropriate recording substrate. The Tschang patent also teaches that gray level additionally may be controlled by modulating the intensity of the light which is directed toward the light valves.

SUMMARY OF THE INVENTION

It is an object of this invention to provide improved apparatus for recording density variations or gray scale within images. This object of the invention is achieved by providing an elongated light gate having a plurality of side-by-side active electrode groups, each of which comprises a plurality of switchable electrodes configured for at least partially encompassing a common interior point in the gate. Projection means are provided for projecting a beam of light toward the light gate. The electrodes comprising the electrode groups are selectively activated for cooperating with a common electrode means to cause blockage of different proportions of the different regions of the beam associated with each electrode group. Each such region corresponds to a picture element in the completed image, and the gray level of that picture element is recorded upon an appropriately positioned imaging member. Control means are provided for selectively activating the switchable electrodes in each active electrode group and thereby controlling the gray level recorded within the associated picture element on the imaging member.

It is another object of the invention to provide an improved method of gray scale recording by spatially gating a light beam directed toward a photosensitive surface.

Still another object of the invention is to provide a light gate for improved gray scale recording.

Other objects and advantages of the invention will be apparent from the following description, the accompanying drawings and the appended claims.

DESCRIPTION OF THE PREFERRED EMBODIMENTS

Figure 1:
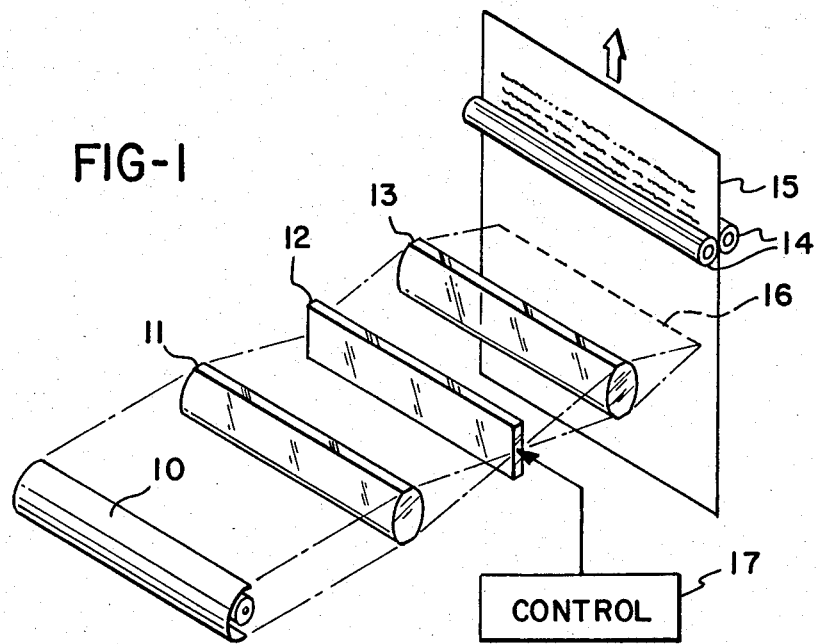
FIG. 1 is a schematic pictorial representation of apparatus in accordance with the present invention.

As illustrated in FIG. 1, the apparatus of this invention may comprise light beam projection means 10 which projects a beam of light successively through a condenser lens 11, a light gate 12, and a focussing lens 13. After passage through the focussing lens 13, the light beam strikes an imaging member 15 in the region indicated by the reference numeral 16. As hereinafter described in detail, control unit 17 causes selective blockage of the light beam by light gate 12, so that a pattern of light and dark spots is projected into area 16 of imaging member 15.

Figure 4:
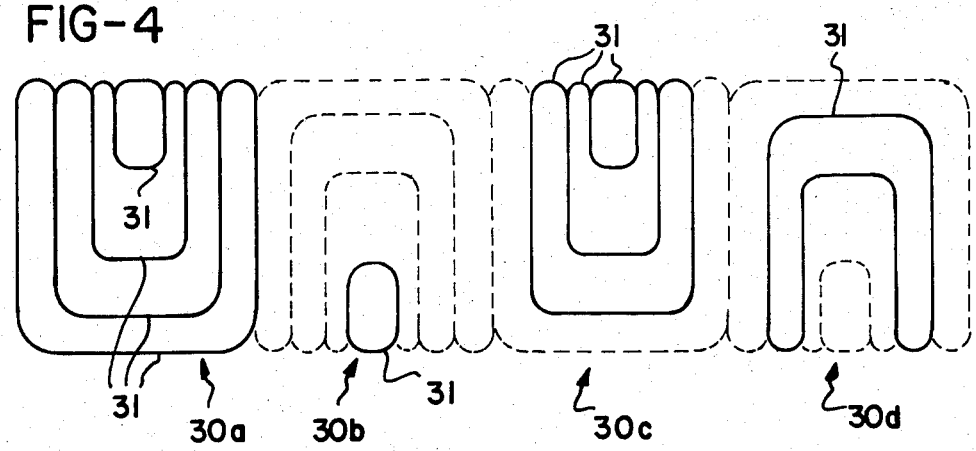
FIG. 4 is an illustration of picture elements recorded by the apparatus of FIGS. 1-3.

As illustrated in FIG. 4, the area 16 comprises a series of picture elements 30, each of which may be too small to be resolved by the human eye. Each picture element 30 is illuminated uniformly except within a selected number of sub-pixel areas 31 wherein the light beam has been selectively blocked. The imaged areas are developed, as hereinafter described, by a pair of pressure rollers 14,14. These rollers also cause imaging member 15 to be transported across the path of the light beam so as to produce a two-dimensional array of picture elements 30a–30d. The entire array of picture elements constitutes a visual representation of image information supplied in electrical form to control unit 17. Each picture element 30 has a gray level which is related to its percentage of non-illuminated area, as represented by its non-illuminated sub-pixels 31. Thus, picture elements 30a–30d of FIG. 4 represent approximate gray levels of 100%, 5%, 60% and 35%, respectively.

In the preferred embodiment, imaging member 15 comprises a support coated on one surface with a layer of radiation-sensitive microcapsules, as described in Sanders et al. U.S. Pat. No. 4,399,209 or 4,440,846. The microcapsules are photohardenable, so that those microcapsules which are illuminated by the light beam resist crushing by the pressure rollers 14,14. Those microcapsules within the darkened areas represented by the sub-pixels 31 are crushed to release a chromogenic material. The released chromogenic material reacts with a developer on the surface of imaging member 15 or on the surface of a separate transfer sheet to produce a visible image. As an alternative, the microcapsules could contain a decolorizing agent as disclosed in Sanders et al. U.S. Pat. No. 4,416,966, but this would produce a color reversal.

The operation of light gate 12 will now be described with reference to FIGS. 2 and 3. The light gate is a sandwich structure comprising electro-optical gating means which may be a lanthanum doped lead zirconate titanate (PLZT) plate 29. A common electrode 24 is plated to the rear side of plate 29, and a set of active electrodes 21a–21d are plated to the front side thereof. PLZT plate 29 responds in a well known manner by becoming birefringent in the presence of an applied electrical field. This rotates the direction of polarization of any incident light rays passing therethrough. It will be appreciated that electrode 24 and electrodes 21a–21d are transparent for enabling such light passage.

Light gate 12 also comprises a pair of transparent spacers 27 and 28, a front polarizer 25 and a rear polarizer 26. Polarizers 25 and 26 are oriented such that they pass light waves having mutually perpendicular planes of polarization. Thus in the normal case light which passes through front polarizer 25 is blocked by rear polarizer 26. However, whenever an electrical potential is applied to any of active electrodes 21a–21d, a field of corresponding geometrical shape is established within PLZT plate 29. This produces a localized 90° rotation of the plane of polarization of any light passing therethrough. Such light then passes through rear polarizer 26 and makes its way to the surface of imaging member 15 where an image of the activated electrode is created.

Figure 2:
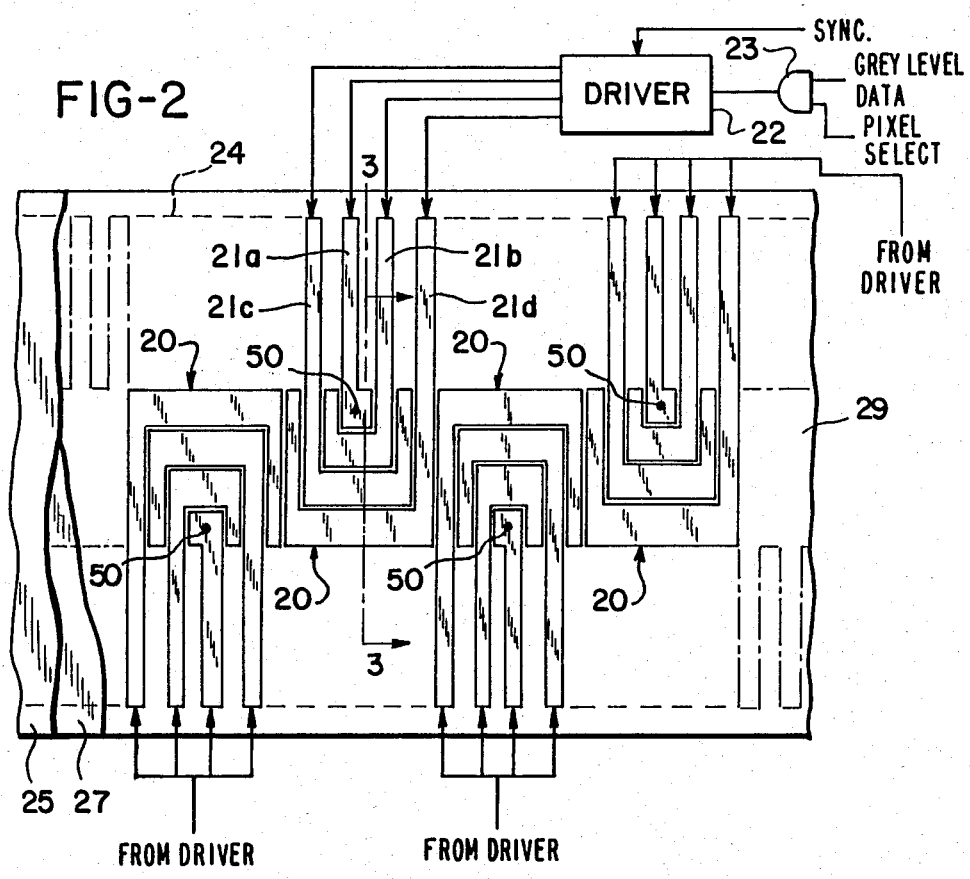
FIG. 2 is an illustration of active electrode groups on a partially cut away light gate.
Figure 3:
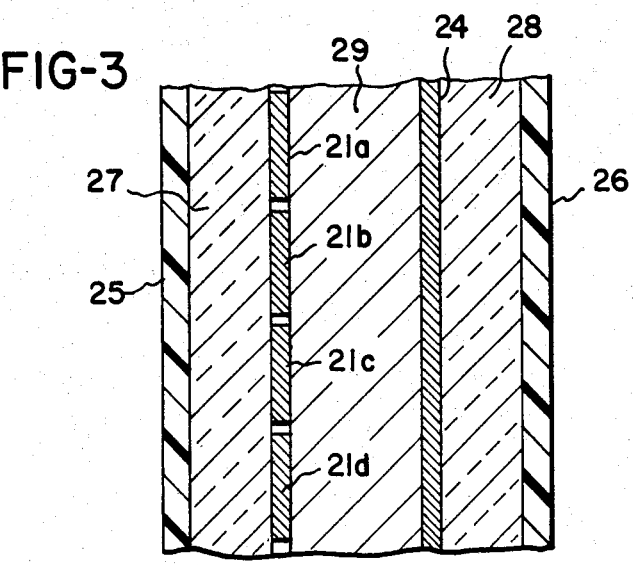
FIG. 3 is a cross sectional view taken along 3—3 of FIG. 2.

As best seen in FIG. 2, the front surface of PLZT plate 29 is provided with a series of active electrode groups 20 each positioned for selective blocking of an associated region of the light beam. Each such electrode group 20 comprises a plurality of active electrodes 21a–21d. These active electrodes are configured for at least partially encompassing a common interior point 50 at successively greater distances therefrom. As a result thereof, the activation of electrodes 21a–21d causes a spatial light gating which produces exposure patterns of the general type illustrated in FIG. 4.

Activation of a set of active electrodes 21a–21d is carried out under control of a driver 22. It will be understood that control unit 17 comprises a series of drivers 22, each of which is supplied with a series of four bit binary codes inversely representing desired gray levels for a sequence of picture elements. The binary codes are supplied to driver 22 via an AND gate 23 which is enabled by a series of sequentially generated pixel select signals. Driver 22 comprises a set of flip flops which are controlled by the binary codes and by a synchronizing signal to activate the active electrodes in appropriate sequential order for recordal of the desired gray levels. By way of example, driver 22 might respond to the sequential binary code 0111 by simultaneously activating electrodes 21a, 21b and 21c to cause imaging of sub-pixel patterns collectively producing the illustrated pixel 30c, thereby recording to gray level of about 60%.

It will be apparent that differently configured arrangements of active electrodes may likewise encompass a common interior point 50 and that electro-optical materials other than PLZT may be used. For instance, the invention may employ liquid crystal materials which darken in the presence of an electrical field, in which case polarizers 25 and 26 would be unnecessary. It is also apparent that the light beam which is gated by light gate 12 need not cause photochemical reactions on imaging member 15. Thus imaging member 15 and pressure rollers 14,14 may be replaced by a photoconductive drum to which a uniform surface charge has been applied. In such an embodiment, the light pattern within the region 16 will produce charge patterns which may be transformed into colored images in accordance with well known xerographic techniques.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a marking apparatus comprising projection means for projecting a beam of light, an elongated light gate including a layer of electro-optical material positioned in the path of said beam for blocking selected portions thereof, control means for controlling said gate to select those portions of said beam which are to be blocked, and an imaging member for receiving those portions of said beam which are not blocked and producing a corresponding series of markings: the improvement wherein said gate comprises common electrode means and a plurality of side-by-side active electrode groups for cooperatively causing blockage of selectively different proportions of said beam; each said active electrode group being positioned for selective blocking of an associated region of said beam and each comprising a plurality of switchable active electrodes configured for at least partially encompassing a common interior point; said control means comprising means for activating the active electrodes in each said group to cause the imaging of a predetermined gray level on said imaging member.

2. The improvement of claim 1 wherein the active electrodes in each said group are positioned at successively greater distances from their common interior point.

3. The improvement of claim 2 wherein said light gate comprises common electrode means; said active electrode groups and said common electrode means being positioned on opposite sides of said layer.

4. The improvement of claim 3 wherein said common electrode means comprises a transparent electrode coextensive with said active electrode groups.

5. The improvement of claim 4 wherein said active electrodes are transparent.

6. A light gate for use with a light beam comprising a layer of electrooptically responsive material, a transparent common electrode on one face thereof and a plurality of groups of transparent active electrodes on the face opposite said one face; each of said groups being positioned for selective blocking of an associated region of said light beam and comprising a plurality of active electrodes configured for at least partially encompassing a common interior point.

7. A light gate according to claim 6 wherein the active electrodes in each said group are positioned at successively greater distances from their common interior point.

8. A light gate according to claim 7 wherein said electro-optically responsive material is birefringent; said light gate further comprising a pair of differently polarized polarizers oppositely positioned outwardly of said faces.

9. Method of image recording comprising the steps of:

projecting a beam of light toward a photosensitive surface, placing in the path of said beam a light gate comprising a series of active electrodes arranged in a plurality of side-by-side electrode groups, each group comprising a plurality of switchable active electrodes configured for at least partially encompassing a common interior point, and gating means responsive to activation of any of said active electrodes for spatially gating a corresponding portion of said beam, producing a series of signals representing gray levels in a plurality of side-by-side picture elements to be recorded, switching said active electrodes groupwise in accordance with said signals so that signals representing the gray level on any picture element cause a corresponding spatial gating of said beam, and treating said photosensitive surface to produce visual images in spatial correspondence with the gating pattern of said beam.

10. Method according to claim 9 wherein said photosensitive surface comprises a developer and photohardenable microcapsules containing a chromogenic material which is reactive with said developer; said treating step comprising the sub-step of crushing those of said microcapsules which are not hardened by exposure to said beam.

* * * * *